United States Defensive Publication [19] (H) [11] T101,202

Furbacher et al. [43] Nov. 3, 1981

[54] CARBURETOR IDLE SYSTEM AIR/FUEL RATIO CONTROL

[76] Inventors: John H. Furbacher, 21559 Military; Edwin K. Ratledge, 307 S. Vernon, both of Dearborn, Wayne County, Mich. 48124; Richard A. Ullmann, 8616 Nancy, Macomb County, Utica, Mich. 48087

[21] Appl. No.: 219,558

[22] Filed: Dec. 23, 1980

Related U.S. Application Data

[63] Continuation of Ser. No. 82,351, Oct. 5, 1979, abandoned.

[51] Int. Cl.[3] ..... F02M 7/02

[52] U.S. Cl. ..... 261/41 D; 261/121 A

[57] ABSTRACT

A carburetor is provided with a separate idle air/fuel system containing an idle fuel metering jet or orifice; and an idle fuel tube connected to an induction passage discharge port downstream of the throttle valve, the idle fuel tube being surrounded or enclosed near the discharge end by an air well connected to a main air bleed, this portion of the idle tube having air bleed holes for mixing air with the fuel to provide acceptable driveability during idle speed operation, the diameter of the holes being mathematically calculatable to vary in a direct relation to the size of the idle metering jet and in an inverse relation to the diameter of the idle air well tube, to provide an essentially constant air/fuel ratio to the idle mixture flow upon changes in either the idle jet size or the idle tube size.

6 Claims, 1 Sheet Drawing,

13 Pages Specification

The file of this unexamined application may be inspected and copies thereof may be purchased (849 O.G. 1221, Apr. 9, 1968).

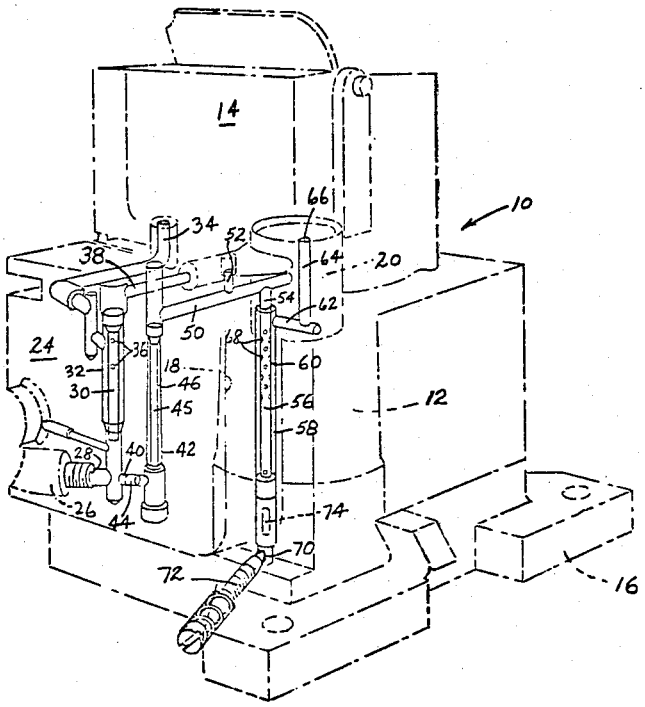

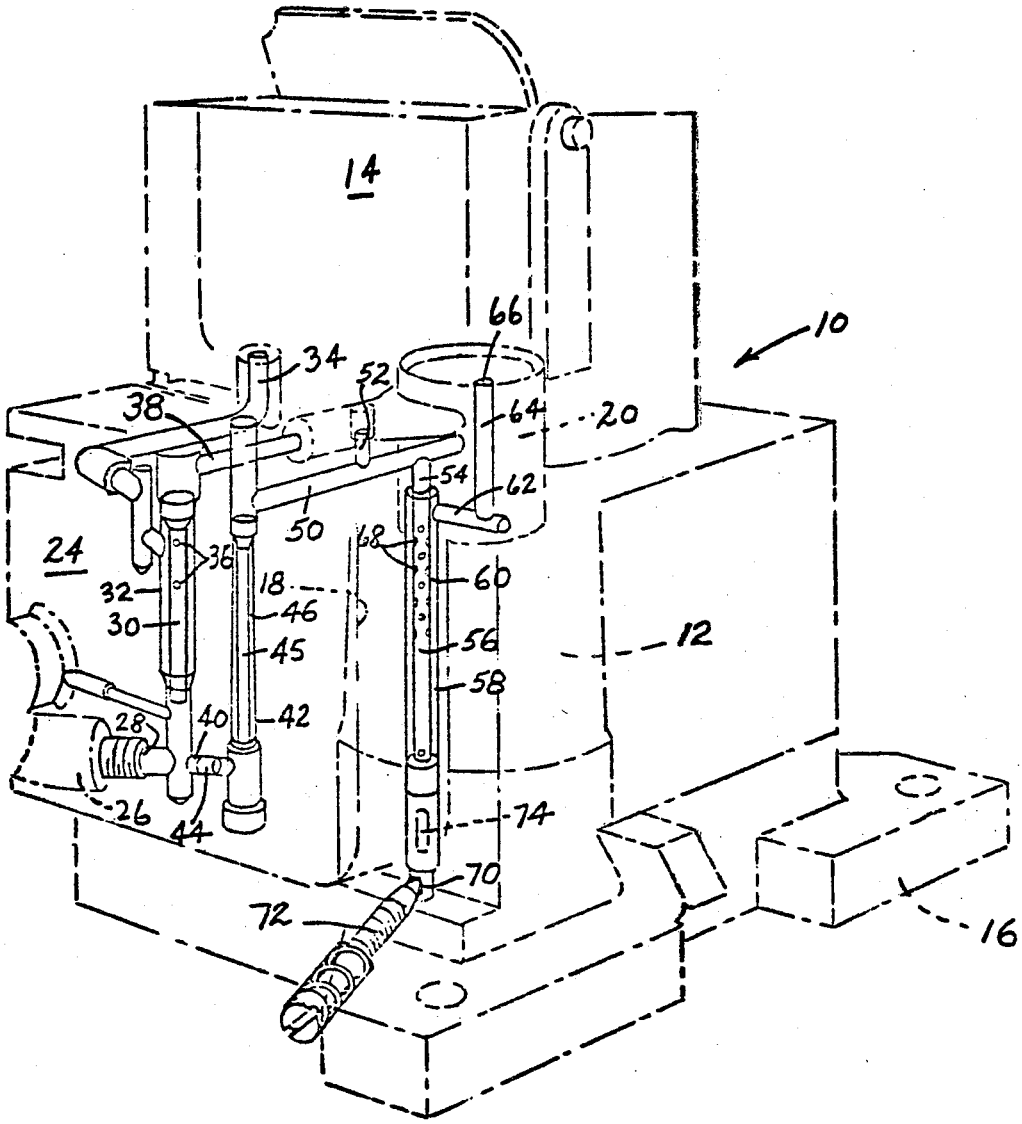
14
10
66
34
52
38
64
20
54
62
50
24
36
68
60
32
18
46
30
45
56
12
58
28
40
42
26
44
74
70
72
16